United States Patent
Uraguchi et al.

(10) Patent No.: US 10,317,010 B2
(45) Date of Patent: Jun. 11, 2019

(54) LIQUEFIED GAS STORAGE TANK AND LIQUEFIED GAS CARRIER SHIP

(71) Applicant: KAWASAKI JUKOGYO KABUSHIKI KAISHA, Kobe-shi, Hyogo (JP)

(72) Inventors: Ryosuke Uraguchi, Akashi (JP); Yukichi Takaoka, Kobe (JP); Tatsuya Motoi, Kobe (JP); Osamu Muragishi, Kakogawa (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 53 days.

(21) Appl. No.: 14/900,274

(22) PCT Filed: Jun. 18, 2014

(86) PCT No.: PCT/JP2014/003273
§ 371 (c)(1),
(2) Date: Dec. 21, 2015

(87) PCT Pub. No.: WO2014/203530
PCT Pub. Date: Dec. 24, 2014

(65) Prior Publication Data
US 2016/0341360 A1    Nov. 24, 2016

(30) Foreign Application Priority Data
Jun. 21, 2013    (JP) .................................. 2013-130902

(51) Int. Cl.
*F17C 3/04*    (2006.01)
*F17C 3/08*    (2006.01)
(Continued)

(52) U.S. Cl.
CPC .............. *F17C 3/025* (2013.01); *B63B 25/14* (2013.01); *B63B 25/16* (2013.01); *B65D 90/028* (2013.01);
(Continued)

(58) Field of Classification Search
CPC .... F17C 3/04; F17C 3/08; F17C 13/00; F17C 13/001; F17C 13/002; F17C 2203/0624;
(Continued)

(56) References Cited

U.S. PATENT DOCUMENTS 3,215,313 A * 11/1965 Stelts ..................... F17C 13/088
                                                    220/560.13
3,374,639 A *  3/1968 Burke ................... F17C 13/126
                                                    62/240
(Continued)

FOREIGN PATENT DOCUMENTS

CN    101943319 A    1/2011
JP    S52-35314 A    3/1977
(Continued)

OTHER PUBLICATIONS

Sep. 30, 2014 International Search Report issued in International Patent Application No. PCT/JP2014/003273.
(Continued)

*Primary Examiner* — Frantz F Jules
*Assistant Examiner* — Erik Mendoza-Wilkenfel
(74) *Attorney, Agent, or Firm* — Oliff PLC

(57) ABSTRACT

A liquefied gas storage tank includes: an inner shell storing a liquefied gas; an outer shell forming a vacuum space between the inner shell and the outer shell; and a fail-safe thermal insulating layer covering an outer side surface of the outer shell. According to this configuration, the fail-safe thermal insulating layer is not disposed in the vacuum space.
(Continued)

This makes it possible to suppress the degradation over time of the degree of vacuum in the vacuum space.

5 Claims, 2 Drawing Sheets

(51) Int. Cl.
| | | |
|---|---|---|
| *F17C 13/00* | (2006.01) | |
| *F17C 3/02* | (2006.01) | |
| *B63B 25/16* | (2006.01) | |
| *B65D 90/22* | (2006.01) | |
| *B65D 90/02* | (2019.01) | |
| *B63B 25/14* | (2006.01) | |

(52) U.S. Cl.
CPC ............... *B65D 90/22* (2013.01); *F17C 3/04* (2013.01); *F17C 2201/0109* (2013.01); *F17C 2201/035* (2013.01); *F17C 2201/054* (2013.01); *F17C 2203/0308* (2013.01); *F17C 2203/0333* (2013.01); *F17C 2203/0391* (2013.01); *F17C 2203/0629* (2013.01); *F17C 2205/018* (2013.01); *F17C 2205/0111* (2013.01); *F17C 2205/0332* (2013.01); *F17C 2205/0379* (2013.01); *F17C 2221/012* (2013.01); *F17C 2221/033* (2013.01); *F17C 2221/035* (2013.01); *F17C 2223/0153* (2013.01); *F17C 2223/0161* (2013.01); *F17C 2223/033* (2013.01); *F17C 2223/043* (2013.01); *F17C 2225/0123* (2013.01); *F17C 2225/033* (2013.01); *F17C 2250/032* (2013.01); *F17C 2250/036* (2013.01); *F17C 2250/038* (2013.01); *F17C 2250/043* (2013.01); *F17C 2250/0439* (2013.01); *F17C 2250/0491* (2013.01); *F17C 2260/033* (2013.01); *F17C 2265/032* (2013.01); *F17C 2265/066* (2013.01); *F17C 2270/0105* (2013.01); *Y02E 60/321* (2013.01)

(58) Field of Classification Search
CPC ........ F17C 2203/068; F17C 2203/0685; F17C 2203/03; F17C 2203/0329; F17C 2203/0333; F17C 2203/0345; F17C 3/025; F17C 2221/012; F17C 2250/0626; F17C 2203/0626; F17C 2203/0629; F17C 2203/0631; F17C 2203/06; F17C 2203/0602; F17C 2203/0612; F17C 2203/0675; F17C 2209/2328
See application file for complete search history.

(56) References Cited

U.S. PATENT DOCUMENTS

| | | | | |
|---|---|---|---|---|
| 3,608,324 A | * | 9/1971 | Singleton | F17C 13/123 62/46.1 |
| 4,106,424 A | * | 8/1978 | Schuler | B63B 25/16 114/74 A |
| 4,674,674 A | * | 6/1987 | Patterson | B60P 3/22 220/592.2 |
| 5,293,750 A | * | 3/1994 | Tamura | F17C 13/02 62/47.1 |
| 5,797,513 A | * | 8/1998 | Olinger | F17C 3/04 220/592.27 |
| 2003/0162141 A1 | * | 8/2003 | Hermann | B01J 3/04 431/202 |
| 2005/0001100 A1 | * | 1/2005 | Hsi-Wu | B29C 44/1228 244/172.2 |
| 2008/0307798 A1 | * | 12/2008 | Luo | F17C 3/02 62/49.1 |
| 2009/0199575 A1 | * | 8/2009 | Faka | F17C 5/02 62/50.1 |
| 2012/0216919 A1 | * | 8/2012 | Nylund | B63B 25/12 141/311 R |
| 2013/0228151 A1 | * | 9/2013 | Dunn | F02M 21/0209 123/294 |

FOREIGN PATENT DOCUMENTS

| | | |
|---|---|---|
| JP | S57-033299 A | 2/1982 |
| JP | S58-6115 B2 | 2/1983 |
| JP | S60-65997 A | 4/1985 |
| JP | S61-244998 A | 10/1986 |
| JP | H01-172700 A | 7/1989 |
| JP | H06-323498 A | 11/1994 |
| JP | H07-232695 A | 9/1995 |
| JP | H10-141595 A | 5/1998 |
| JP | 2000-110994 A | 4/2000 |
| JP | 3246539 B2 | 1/2002 |
| JP | 2005-029087 | 2/2005 |
| JP | 2011-245995 A | 12/2011 |
| JP | 2014-118206 A | 6/2014 |
| KR | 1020130034702 | 4/2013 |

OTHER PUBLICATIONS

Dec. 22, 2015 International Preliminary Report on Patentability issued in International Patent Application No. PCT/JP2014/003273.
Jan. 19, 2017 Extended Search Report issued in European Patent Application No. 14814324.1.

* cited by examiner

LIQUEFIED GAS STORAGE TANK AND LIQUEFIED GAS CARRIER SHIP

TECHNICAL FIELD

The present invention relates to a liquefied gas storage tank used for transporting and storing a liquefied gas and to a liquefied gas carrier ship including the liquefied gas storage tank.

BACKGROUND ART

Conventionally, a liquefied gas storage tank with a double-shell structure in which a vacuum space is formed between an inner shell and an outer shell is known as a tank for an ultracold liquefied gas. For example, Patent Literature 1 discloses a liquefied gas storage tank, in which the outer side surface of an inner shell is covered with a thermal insulating film, and the inner side surface of an outer shell is covered with a leakage-prevention thermal insulating layer.

Since the ultracold liquefied gas has an extremely low boiling point, the liquefied gas comes to the boil if the degree of vacuum in the vacuum space degrades and heat is transferred from the outer shell to the inner shell. In the liquefied gas storage tank disclosed in Patent Literature 1, the leakage-prevention thermal insulating layer is provided for preventing such boiling of the liquefied gas. Specifically, even if the degree of vacuum in the vacuum space has degraded, the leakage-prevention thermal insulating layer keeps the thermal insulation of the liquefied gas storage tank to a certain degree.

CITATION LIST

Patent Literature

PTL1: Japanese Laid-Open Patent Application Publication No. H10-141595

SUMMARY OF INVENTION

Technical Problem

Patent Literature 1 discloses that the leakage-prevention thermal insulating layer is made of a foamable thermal insulating material. However, in a case where such a foamable thermal insulating material is disposed on the inner side surface of the outer shell, if the degree of vacuum in the vacuum space is high, gas will come out over time from the surface of a resin that forms the foamable thermal insulating material (here, the gas is not air within voids in the foamable thermal insulating material but gas that is captured between the molecules of the resin). Therefore, there is a risk that the degree of vacuum may degrade over time.

In view of the above, an object of the present invention is to provide a liquefied gas storage tank capable of suppressing the degradation over time of the degree of vacuum in the vacuum space, and to provide a liquefied gas carrier ship including the liquefied gas storage tank.

Solution to Problem

In order to solve the above-described problems, a liquefied gas storage tank according to the present invention includes: an inner shell storing a liquefied gas; an outer shell forming a vacuum space between the inner shell and the outer shell; and a fail-safe thermal insulating layer covering an outer side surface of the outer shell.

According to the above configuration, the fail-safe thermal insulating layer is not disposed in the vacuum space. This makes it possible to suppress the degradation over time of the degree of vacuum in the vacuum space.

The above liquefied gas storage tank may further include a vacuum area thermal insulating layer spaced apart from an inner side surface of the outer shell and covering an outer side surface of the inner shell. This configuration makes it possible to prevent thermal transfer due to thermal radiation between the inner shell and the outer shell.

A liquefied gas carrier ship according to the present invention includes: the above liquefied gas storage tank; and a tank cover, which encases the liquefied gas storage tank to form a space between the liquefied gas storage tank and the tank cover. An inert gas is enclosed in the space between the liquefied gas storage tank and the tank cover.

According to the above configuration, for example, even if the liquefied gas, which is an ultracold liquefied gas whose temperature is lower than the liquefying temperature of oxygen, leaks from the inner shell into the vacuum space, liquefied oxygen can be prevented from being generated around the liquefied gas storage tank.

The above liquefied gas carrier ship may further include: a vacuum degree detector, which detects a degree of vacuum in the vacuum space between the inner shell and the outer shell of the liquefied gas storage tank; and a notification device, which notifies whether the degree of vacuum detected by the vacuum degree detector is in a voyage possible range or a port-call necessary range. According to the above configuration, a ship operator can readily determine whether to continue the voyage or make a port call.

The above liquefied gas carrier ship may further include: a relief passage, which leads a boil off gas generated in the inner shell to outside the tank cover; and a relief valve, which is provided on the relief passage and opens when a pressure in the inner shell has become higher than or equal to a predetermined pressure. This configuration makes it possible to maintain the pressure in the inner shell within a predetermined pressure range even if the liquefied gas comes to the boil in the inner shell and a large amount of boil off gas is generated.

The above liquefied gas carrier ship may further include: a gas combustion unit operative to combust a boil off gas generated in the inner shell; a combustion passage, which leads the boil off gas from the inner shell to the gas combustion unit; and an on-off valve, which is provided on the combustion passage and opens when a pressure in the inner shell has become higher than or equal to a predetermined pressure. This configuration makes it possible to maintain the pressure in the inner shell within a predetermined pressure range even if the liquefied gas comes to the boil in the inner shell and a large amount of boil off gas is generated.

Advantageous Effects of Invention

The present invention makes it possible to suppress degradation over time of the degree of vacuum in the vacuum space.

DESCRIPTION OF EMBODIMENTS

Figure 1:
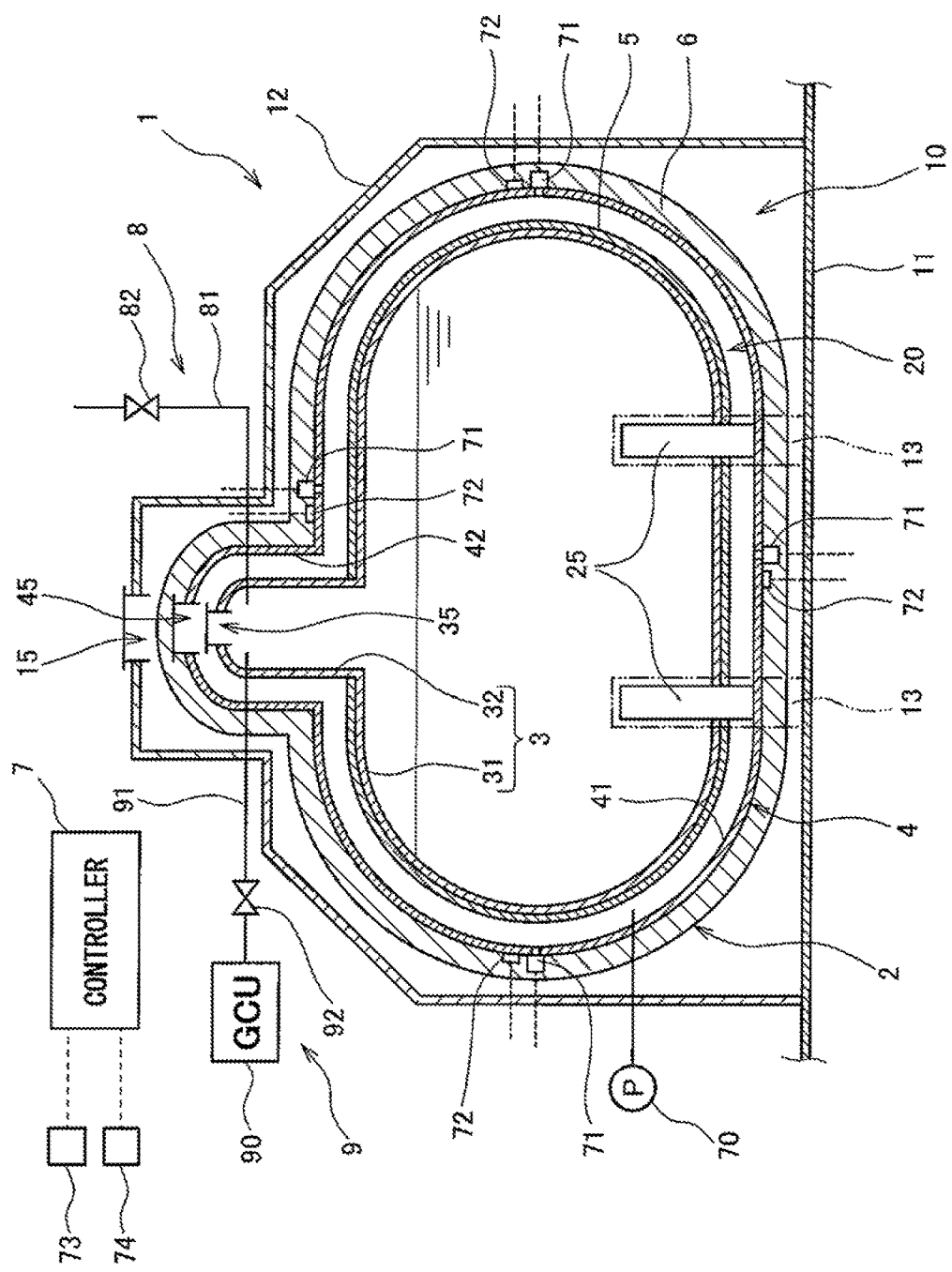
FIG. 1 is a sectional side view of a part of a liquefied gas carrier ship on which a liquefied gas storage tank according to one embodiment of the present invention is mounted.

FIG. 1 shows a part of a liquefied gas carrier ship 1, on which a liquefied gas storage tank 2 according to one embodiment of the present invention is mounted.

In the present embodiment, the liquefied gas storage tank 2 is a horizontal type cylindrical tank. However, the liquefied gas storage tank 2 may alternatively be a spherical tank. It is not essential that the liquefied gas storage tank 2 be mounted on the liquefied gas carrier ship 1. Alternatively, for example, the liquefied gas storage tank 2 may be installed on the ground as a liquefied gas storage tank for a power station. In this case, the liquefied gas storage tank 2 may be, for example, a cylindrical tank whose axial direction is parallel to the vertical direction.

The liquefied gas storage tank 2 is disposed such that the axial direction of the tank 2 is parallel to the ship length direction. Specifically, the liquefied gas storage tank 2 is a double-shell tank and includes an inner shell 3 storing a liquefied gas and an outer shell 4 forming a vacuum space 20 between the inner shell 3 and the outer shell 4.

The liquefied gas stored in the inner shell 3 is an ultracold liquefied gas, such as liquefied natural gas (LNG, about −160° C.) or liquefied hydrogen (LH$_2$, about −250° C.). However, the stored liquefied gas may alternatively be a liquefied gas having a relatively high temperature, such as liquefied petroleum gas (LPG, about −45° C.) or liquefied ethylene gas (LEG, about −100° C.).

The inner shell 3 includes an inner shell main part 31 and an inner shell dome 32. The inner shell main part 31 includes: a body portion extending laterally with a constant cross-sectional shape; and hemispherical sealing portions sealing openings on both sides of the body portion. Alternatively, each sealing portion may have a flat shape perpendicular to the body portion or may be dish-shaped. The inner shell dome 32 is provided for putting pipes penetrating the inner shell 3 into one place. In the present embodiment, the inner shell dome 32 protrudes upward from the body portion of the inner shell main part 31. However, the inner shell dome 32 may protrude, for example, diagonally upward from the body portion or one of the sealing portions of the inner shell main part 31.

The outer shell 4 includes an outer shell main part 41 surrounding the inner shell main part 31 and an outer shell dome 42 surrounding the inner shell dome 32. That is, the outer shell main part 41 has the shape of the inner shell main part 31, but is larger than the inner shell main part 31, and the outer shell dome 42 has the shape of the inner shell dome 32, but is larger than the inner shell dome 32.

The outer shell main part 41 is supported by, for example, a pair of saddles 13 provided on a ship bottom 11 at positions that are spaced apart from each other in the axial direction of the tank 2. A pair of supporting members 25, which supports the inner shell main part 31 at the same positions as the saddles 13, is disposed between the inner shell main part 31 and the outer shell main part 41.

The inner shell dome 32 and the outer shell dome 42 are provided with a manhole 35 and a manhole 45, respectively, through which the inside of the inner shell 3 can be inspected. However, as an alternative, the inner shell main part 31 and the outer shell main part 41 may be provided with the manhole 35 and the manhole 45, respectively.

The liquefied gas storage tank 2 includes: a vacuum area thermal insulating layer 5 for preventing thermal transfer due to thermal radiation in the vacuum space 20; and a fail-safe thermal insulating layer 6 for preventing the liquefied gas from boiling even if the degree of vacuum in the vacuum space 20 has degraded. The vacuum area thermal insulating layer 5 is spaced apart from the inner side surface of the outer shell 4, and is in close contact with the outer side surface of the inner shell 3 to cover the outer side surface. The fail-safe thermal insulating layer 6 is in close contact with the outer side surface of the outer shell 4 to cover the outer side surface.

In the present embodiment, the vacuum area thermal insulating layer 5 is disposed only on the outer side surface of the inner shell main part 31. However, as an alternative, the vacuum area thermal insulating layer 5 may be disposed not only on the outer side surface of the inner shell main part 31 but also on the outer side surface of the inner shell dome 32. In other words, the entire outer side surface of the inner shell 3 may be covered with the vacuum area thermal insulating layer 5. The fail-safe thermal insulating layer 6 is disposed on the outer side surface of the outer shell main part 41 and the outer side surface of the outer shell dome 42 in a manner to cover the entire outer side surface of the outer shell 4.

The vacuum area thermal insulating layer 5 is formed by stacking a thermal radiation shield sheet and a spacer alternately. The thermal radiation shield sheet is formed of a synthetic resin sheet and a metal coating. The metal coating is formed, for example, by vapor-depositing aluminum (alternatively, gold or silver) on the surface of the synthetic resin sheet. The spacer is a sheet made of a resin with low thermal conductivity. Examples of the sheet include a net, a woven fabric, and a nonwoven fabric. As one example, the vacuum area thermal insulating layer 5 is fixed on the outer side surface of the inner shell 3 by a restricting member (e.g., a mesh member) that is wound around the outside of the vacuum area thermal insulating layer 5.

Figure 2:
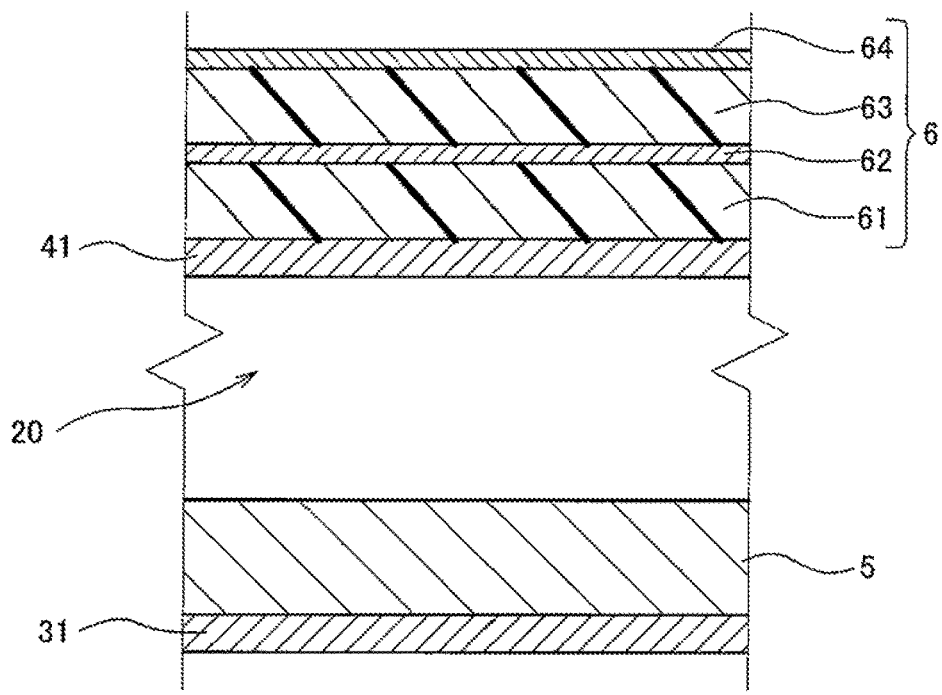
FIG. 2 is an enlarged sectional view of a part of the liquefied gas storage tank shown in FIG. 1.

The fail-safe thermal insulating layer 6 has a double-layer structure including an inner thermal insulating layer 61 and an outer thermal insulating layer 63 as shown in FIG. 2. A reinforcing member 62 is disposed between the inner thermal insulating layer 61 and the outer thermal insulating layer 63. An aluminum plastic sheet 64 is disposed on the surface of the outer thermal insulating layer 63. The reinforcing member 62 is a metal mesh, for example. When the fail-safe thermal insulating layer 6 is fixed by using stud bolts (not shown) provided on the outer side surface of the outer shell 4, the reinforcing member 62 functions as a seat for washers and nuts.

As one example, phenolic resin foam, which does not easily crack or break due to cooling, can be used as the inner thermal insulating layer 61. As one example, hard polyurethane foam, which is easy to care for, can be used as the outer thermal insulating layer 63.

Returning to FIG. 1, the liquefied gas carrier ship 1 is equipped with a tank cover 12, which encases the liquefied gas storage tank 2 to form a space 10 between the liquefied gas storage tank 2 and the tank cover 12. That is, the tank cover 12 is spaced apart from the fail-safe thermal insulating layer 6 over the entire circumference. Specifically, the tank cover 12 has a shape open downward, and forms a sealed space together with the hull (e.g., together with the ship bottom 11 or a bulkhead). It should be noted that the tank cover 12 is provided with a manhole 15 at a position corresponding to the positions of the manholes 35 and 45 of the liquefied gas storage tank 2.

An inert gas is enclosed in the space 10 between the liquefied gas storage tank 2 and the tank cover 12. Examples of the inert gas include nitrogen and argon. By enclosing such an inert gas, for example, even if the ultracold liquefied gas, whose temperature is lower than the liquefying temperature of oxygen, leaks from the inner shell 3 into the vacuum space 20, liquefied oxygen can be prevented from being generated around the liquefied gas storage tank 2. The inert gas enclosed in the space 10 is preferably a dry gas since the fail-safe thermal insulating layer 6 can be kept dry with the use of the dry gas.

Further, the liquefied gas carrier ship 1 includes systems for maintaining the pressure in the inner shell 3 within a predetermined pressure range even if the liquefied gas comes to the boil in the inner shell 3 and a large amount of boil off gas is generated. The systems are: a combustion system 9, which combusts the boil off gas; and a release-to-atmosphere system 8, which releases the boil off gas to the atmosphere. The liquefied gas carrier ship 1 further includes: vacuum degree detectors 71 for detecting the degree of vacuum (unit: Pa) in the vacuum space 20 between the inner shell 3 and the outer shell 4; temperature sensors 72 for detecting the temperature of the outer shell 4; a vacuum pump 70 capable of vacuum-drawing the vacuum space 20; and a controller 7, which controls the vacuum pump 70 based on results of the detection by the vacuum degree detectors 71 and the temperature sensors 72. The controller 7 is connected to an alarm device 73 and an indicator 74.

Usually, the liquefied gas carrier ship 1 adopts a large liquefied gas storage tank 2 in which the volume of the vacuum space 20 is several hundred cubic meters ($m^3$). In such a large liquefied gas storage tank 2, the degree of vacuum in the vacuum space 20 varies by position. For this reason, the vacuum degree detectors 71 are suitably disposed at different positions, respectively. For example, the vacuum degree detectors 71 are disposed at both sides of the tank 2 in the axial direction, and disposed above and below the tank 2.

Each temperature sensor 72 is used for determining whether or not degradation of the degree of vacuum detected by a corresponding one of the vacuum degree detectors 71 is such degradation as to cause a change in the temperature of the outer shell 4. Accordingly, each temperature sensor 72 is disposed in the vicinity of the corresponding one of the vacuum degree detectors 71.

The controller 7 stores at least three setting values as vacuum degree determination references. The three setting values are: a vacuum degree allowable limit R0; a consecutive voyage possible limit R1 set to a degree of vacuum lower than R0 (higher than R0 as a pressure value); and an avoidance voyage possible limit R2 set to a degree of vacuum lower than R1. The vacuum degree allowable limit R0 is a degree of vacuum in the vacuum space 20, which raises a concern about degradation of the thermal insulation effect of the vacuum space 20. If the degree of vacuum in the vacuum space 20 is higher than the vacuum degree allowable limit R0 (i.e., lower than R0 as a pressure value), safe voyage can be continued without operating the vacuum pump 70. The vacuum degree allowable limit R0 can be set based on the volume of the vacuum space 20. The consecutive voyage possible limit R1 is a vacuum degree limit value, at or below which consecutive voyages can be safely continued by operating the vacuum pump 70 continuously or for a particular period. The consecutive voyage possible limit R1 can be set based on the capacity of the vacuum pump 70 and the volume of the vacuum space 20. Also, the consecutive voyage possible limit R1 is a degree of vacuum, at which the liquefied gas carrier ship that is currently voyaging starts an avoidance voyage for making a port call at the nearest repairing facility. The avoidance voyage possible limit R2 can be set to such a degree of vacuum that the pressure in the inner shell 3 will not reach its design pressure within a number of voyage days required for the avoidance voyage of the liquefied gas carrier ship. The avoidance voyage possible limit R2 can be set by taking account of not only the capacity of the vacuum pump 70 and the volume of the vacuum space 20 but also the capacity of the combustion system 9 and the value of the pressure in the inner shell 3.

Figure 3:
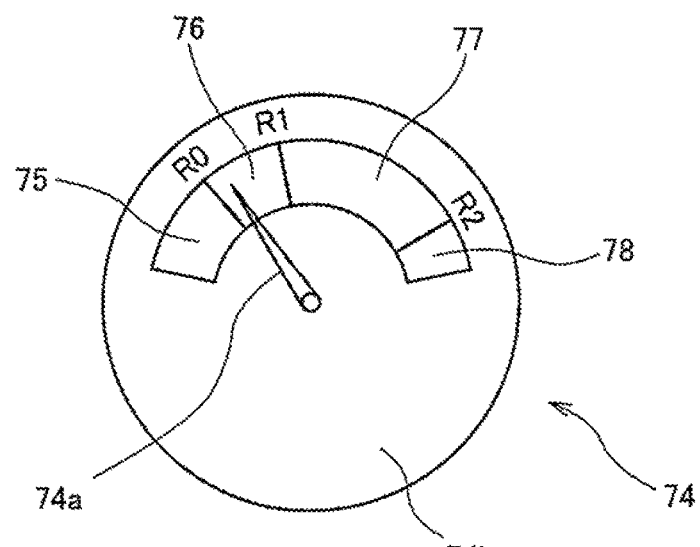
FIG. 3 shows an indicator, which is one example of a notification device.

The controller 7 outputs a vacuum degree signal to the indicator 74, the vacuum degree signal corresponding to the lowest value among the degrees of vacuum detected by the vacuum degree detectors 71 (i.e., corresponding to a vacuum degree value at a position where the degree of vacuum has most degraded). As shown in FIG. 3, the indicator 74 includes, for example, a needle 74a and an indication plate 74b. On the indication plate 74b, a normal voyage range 75 and a semi-normal voyage range 76, which collectively form a voyage possible range, and an avoidance voyage range 77 and an abnormal voyage range 78, which collectively form a port-call necessary range, are drawn. The needle 74a is moved in accordance with the vacuum degree signal, thereby indicating which range the detected degree of vacuum is in. That is, the indicator 74 functions as a notification device, which notifies whether the degree of vacuum detected by the vacuum degree detector 71 is in the voyage possible range or the port-call necessary range. This allows a ship operator to readily determine whether to continue the voyage or make a port call. In particular, by using the indicator 74 as in the present embodiment, the determination can be made by merely glancing at the indicator 74. The vacuum degree allowable limit R0 is at the boundary between the normal voyage range 75 and the semi-normal voyage range 76. The consecutive voyage possible limit R1 is at the boundary between the semi-normal voyage range 76 and the avoidance voyage range 77. The avoidance voyage possible limit R2 is at the boundary between the avoidance voyage range 77 and the abnormal voyage range 78.

When the lowest value among the degrees of vacuum detected by the vacuum degree detectors 71 is beyond the vacuum degree allowable limit R0, the controller 7 outputs an alarm signal to the alarm device 73 to cause the alarm device 73 to output an alarm, and operates the vacuum pump 70. By checking the indicator 74, the ship operator can understand that the voyage can be continued with no problem.

Even if the vacuum pump 70 is operated, the degree of vacuum in the vacuum space 20 may continue degrading and the lowest value among the degrees of vacuum detected by the vacuum degree detectors 71 may go beyond the consecutive voyage possible limit R1. In this case, the controller 7 outputs an alarm signal to the alarm device 73 again to cause the alarm device 73 to output an alarm. The alarm outputted at this time may be the same as the alarm outputted when the lowest value is beyond the vacuum degree allowable limit R0. However, it is desirable that these alarms be different from each other. By checking the indicator 74, the ship operator can understand that it is necessary to discontinue the voyage and make a port call. In addition, even if the vacuum pump 70 is operated, the degree of vacuum in the vacuum space 20 may continue degrading, and when the lowest value among the degrees of vacuum detected by the vacuum degree detectors 71 has reached the avoidance voyage possible limit R2, the controller 7 outputs an abnormality alarm signal to the alarm device 73 to cause the alarm device 73 to output an abnormality alarm.

The controller 7 may have functions of: calculating average values and average time derivative values of detection values obtained by the vacuum degree detector 71 and the temperature sensor 72 in a sample period; and estimating based on the detection values and the calculated values when the degree of vacuum will reach each of the vacuum-degree limits.

The controller 7 can store the degree of vacuum for a predetermined period, calculate a vacuum degree change rate for the degree of vacuum, and make voyage determinations based on the degree of vacuum and the vacuum degree change rate. Examples of the voyage determinations include determining when to repair the ship and changing a voyage schedule.

The voyage determinations may be made by taking account of the amount of suction by the vacuum pump and a change in leakage amount due to the atmospheric temperature, in addition to the vacuum degree change rate.

The above-described combustion system 9 includes: a gas combustion unit (GCU) 90 operative to combust the boil off gas generated in the inner shell 3; and a combustion passage 91, which leads the boil off gas from the inner shell 3 to the gas combustion unit 90. The combustion passage 91 is provided with an on-off valve 92, which opens when the pressure in the inner shell 3 has become higher than or equal to a first setting pressure (predetermined pressure of the present invention). The on-off valve 92 may be a relief valve that automatically opens in accordance with the pressure in the inner shell 3. Alternatively, the on-off valve 92 may be a solenoid valve, and a pressure gauge for detecting the pressure in the inner shell 3 may be provided. In this case, when the pressure detected by the pressure gauge has become higher than or equal to the first setting pressure, the controller 7 may open the on-off valve 92.

The release-to-atmosphere system 8 includes a relief passage 81, which leads the boil off gas generated in the inner shell 3 to outside the tank cover 12. The relief passage 81 is provided with a relief valve 82, which opens when the pressure in the inner shell 3 has become higher than or equal to a second setting pressure (predetermined pressure of the present invention).

In the present embodiment, the second setting pressure is higher than the first setting pressure. When the degree of vacuum in the vacuum space 20 has degraded and the boil off gas is continuously generated in the inner shell 3, the combustion system 9 starts operating first while the release-to-atmosphere system 8 operates preliminarily. For example, the first setting pressure is a pressure when the degree of vacuum in the vacuum space 20 is in the avoidance voyage range 77, and the second setting pressure is a pressure when the degree of vacuum in the vacuum space 20 is in the abnormal voyage range 78. However, as an alternative, the first setting pressure may be higher than the second setting pressure, and the release-to-atmosphere system 8 may start operating first while the combustion system 9 operates preliminarily. It should be noted that, alternatively, not both but only one of the release-to-atmosphere system 8 and the combustion system 9 may be adopted.

The liquefied gas carrier ship 1 may include a disposal system, which disposes of the liquefied gas over the sea when the treatment of the boil off gas even with the release-to-atmosphere system 8 is insufficient. For example, the pressure at the time of disposing of the liquefied gas over the sea is the pressure when the degree of vacuum in the vacuum space 20 is in the abnormal voyage range 78.

As described above, in the liquefied gas storage tank 2 according to the present embodiment, the fail-safe thermal insulating layer 6 is not disposed in the vacuum space 20. This makes it possible to suppress the degradation over time of the degree of vacuum in the vacuum space 20. Owing to the fail-safe thermal insulating layer 6, the liquefied gas is prevented from boiling when the degree of vacuum in the vacuum space 20 has degraded. Therefore, it is not necessary to provide a full secondary barrier (i.e., another vacuum space outside the vacuum space 20). Further, in the present embodiment, since the outer side surface of the inner shell 3 is covered with the vacuum area thermal insulating layer 5, thermal transfer due to thermal radiation between the inner shell and the outer shell can be prevented.

Other Embodiments

The present invention is not limited to the above-described embodiment. Various modifications can be made without departing from the spirit of the invention.

For example, the vacuum area thermal insulating layer 5 may be eliminated. The notification device is not limited to a visual notification device such as the indicator 74, but may be, for example, an audio notification device that notifies, by audio, whether the degree of vacuum detected by the vacuum degree detector 71 is in the voyage possible range or the port-call necessary range.

INDUSTRIAL APPLICABILITY

The liquefied gas storage tank according to the present invention is useful not only as a tank mounted on a liquefied gas carrier ship, but also as a tank installed on the ground.

REFERENCE SIGNS LIST 1 liquefied gas carrier ship
10 space
12 tank cover
2 liquefied gas storage tank
20 vacuum space
3 inner shell
4 outer shell
5 vacuum area thermal insulating layer
6 fail-safe thermal insulating layer
71 vacuum degree detector
74 indicator (notification device)
75 normal voyage range (voyage possible range)
76 semi-normal voyage range (voyage possible range)
77 avoidance voyage range (port-call necessary range)
78 abnormal voyage range (port-call necessary range)
81 relief passage
82 relief valve
90 gas combustion unit
91 combustion passage
92 on-off valve

The invention claimed is:
1. A liquefied gas carrier ship comprising:
   a liquefied gas storage tank comprising:
     an inner shell storing a liquefied gas;
     an outer shell forming a vacuum space between the inner shell and the outer shell;
     a fail-safe thermal insulating layer covering an outer side surface of the outer shell and including a layer made of a foamable material; and a vacuum area thermal insulation layer spaced apart from an inner side surface of the outer shell and covering an outer side surface of the inner shell;

a vacuum degree detector, which detects a degree of vacuum in the vacuum space between the inner shell and the outer shell of the liquefied gas storage tank;

an indicator, which notifies whether the degree of vacuum detected by the vacuum degree detector is in a voyage possible pressure range or a port-call necessary pressure range;

a relief passage, which leads a boil off gas generated in the inner shell to outside; and a relief valve, which is provided on the relief passage and opens when a pressure in the inner shell has become higher than or equal to a predetermined pressure, wherein the predetermined pressure, at or above which the relief valve opens, is a pressure when the degree of vacuum in the vacuum space is in the port-call necessary pressure range.

2. The liquefied gas carrier ship according to claim 1, further comprising:

a tank cover, which encases the liquefied gas storage tank to form a space between the liquefied gas storage tank and the tank cover, wherein an inert gas is enclosed in the space between the liquefied gas storage tank and the tank cover.

3. The liquefied gas carrier ship according to claim 1, further comprising:

a gas combustion unit operative to combust a boil off gas generated in the inner shell;

a combustion passage, which leads the boil off gas from the inner shell to the gas combustion unit; and an on-off valve, which is provided on the combustion passage and opens when a pressure in the inner shell has become higher than or equal to a predetermined pressure.

4. The liquefied gas carrier ship according to claim 1, wherein the indicator is configured to provide a visible notification.

5. The liquefied gas carrier ship according to claim 1, wherein the indicator is configured to provide an audible notification.

* * * * *